(12) United States Patent
Hong

(10) Patent No.: US 8,941,272 B2
(45) Date of Patent: Jan. 27, 2015

(54) LINEAR VIBRATOR AND METHOD OF MANUFACTURING THE SAME

(75) Inventor: Jung Taek Hong, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 351 days.

(21) Appl. No.: 13/352,943

(22) Filed: Jan. 18, 2012

(65) Prior Publication Data

US 2013/0093266 A1    Apr. 18, 2013

(30) Foreign Application Priority Data

Oct. 18, 2011  (KR) .................. 10-2011-0106316

(51) Int. Cl.
*H02K 33/00* (2006.01)
*H02K 33/18* (2006.01)

(52) U.S. Cl.
CPC ..................................... *H02K 33/18* (2013.01)
USPC ............................................. 310/15; 310/25

(58) Field of Classification Search
CPC ........ H02K 33/16; H02K 33/18; H02K 33/00
USPC .................... 310/15, 17, 25, 29, 32
See application file for complete search history.

(56) References Cited

U.S. PATENT DOCUMENTS

| 8,030,806 | B2 * | 10/2011 | Jung | 310/15 |
|---|---|---|---|---|
| 8,519,574 | B2 * | 8/2013 | Jung | 310/15 |
| 8,629,582 | B2 * | 1/2014 | Jung | 310/15 |
| 2003/0227225 | A1 * | 12/2003 | Kaneda et al. | 310/81 |
| 2007/0187172 | A1 * | 8/2007 | Kaneda et al. | 181/181 |
| 2007/0207672 | A1 | 9/2007 | Takagi et al. | |
| 2008/0306332 | A1 | 12/2008 | Choi et al. | |
| 2010/0127581 | A1 * | 5/2010 | Yun et al. | 310/25 |
| 2011/0309692 | A1 * | 12/2011 | Park | 310/25 |
| 2012/0119595 | A1 | 5/2012 | Choi et al. | |
| 2012/0169153 | A1 | 7/2012 | Ueda et al. | |
| 2012/0187780 | A1 * | 7/2012 | Bang et al. | 310/25 |
| 2013/0099603 | A1 * | 4/2013 | Lee | 310/25 |

FOREIGN PATENT DOCUMENTS

| JP | 2007-229582 | 9/2007 |
|---|---|---|
| JP | 2011-011138 A | 1/2011 |
| KR | 10-2008-0107506 | 12/2008 |
| KR | 10-2010-0117896 A | 11/2010 |
| KR | 10-1046003 B1 | 7/2011 |

OTHER PUBLICATIONS

Korean Office Action issued in Korean Patent Application No. 10-2011-0106316, mailed on Dec. 20, 2012, with Eng. Translation.
Office Action dated Jul. 16, 2014 issued in the corresponding Chinese Patent Application No. 201210022818.4.

* cited by examiner

*Primary Examiner* — Thanh Lam
(74) *Attorney, Agent, or Firm* — McDermott Will & Emery LLP

(57) ABSTRACT

There is provided a linear vibrator including a case including a cylindrical sidewall part forming a sidewall thereof and a cover coupled to one end of the sidewall part, and an elastic member including at least one connection protrusion and connected to the case while the connection protrusion is interposed between the sidewall part and the cover.

6 Claims, 4 Drawing Sheets

LINEAR VIBRATOR AND METHOD OF MANUFACTURING THE SAME

CROSS-REFERENCE TO RELATED APPLICATIONS

This application claims the priority of Korean Patent Application No. 10-2011-0106316 filed on Oct. 18, 2011, in the Korean Intellectual Property Office, the disclosure of which is incorporated herein by reference.

BACKGROUND OF THE INVENTION

1. Field of the Invention

The present invention relates to a linear vibrator and a method of manufacturing the same, and more particularly, to a linear vibrator allowing for ease in manufacturing and coupling of components thereof and a method of manufacturing the same.

2. Description of the Related Art

Recently, touch screen type personal portable electronic devices have come into widespread use. These touch type terminals generally include a vibration mechanism generating vibrations as touch feedback.

A vibration motor, converting electrical energy into mechanical vibrations using the principle of generating electromagnetic force, is mounted in a personal portable electronic device to be used for providing touch feedback or for silently notifying a user of call reception by transferring vibrations thereto.

According to the related art, a vibration motor using a scheme of obtaining mechanical vibrations by generating rotational force to rotate a rotating part having unbalanced mass has been mainly used.

However, in the case of the vibration motor using the rotational force as described above, since mechanical friction may be generated between a brush and a commutator and electrical sparks may be generated accordingly, foreign objects may be generated, such that a lifespan of the motor may be shortened.

In addition, since it takes time to arrive at a target amount of vibrations at the time of the application of voltage to the motor, due to rotational inertia, there may be a problem in implementing vibrations appropriate for touch feedback.

In order to solve these problems, a linear vibrator has mainly been used, instead of the vibration motor using rotational force.

The linear vibrator uses a scheme of periodically generating vibrations by allowing an elastic member installed therein and a mass body suspending on the elastic member to be vibrated at a resonant frequency, rather than using the rotational principle of the motor.

Generally, a linear vibrator is configured of a fixed part and a vibration part. More specifically, the fixed part is disposed in an inner portion of a case, and the vibration part is disposed to be vibrated in the inner portion of the case through the elastic member.

However, according to the related art, the elastic member may be welded to the inner surface of the case to be connected thereto. Therefore, in order to assemble the linear vibrator, the elastic member should first be connected to the case and the vibration part should then be connected to the elastic member. As a result, a process may be complicated and automation may be difficult to implement. In addition, foreign objects may be generated during a welding process and remain in the case, such that a defect is caused therein.

SUMMARY OF THE INVENTION

An aspect of the present invention provides a linear vibrator and a method of manufacturing the same allowing for ease in manufacturing.

Another aspect of the present invention provides a linear vibrator and a method of manufacturing the same allowing for automation thereof.

Another aspect of the present invention provides a linear vibrator capable of preventing foreign objects from being generated therein during a manufacturing process thereof, and a method of manufacturing the same.

According to an aspect of the present invention, there is provided a linear vibrator including: a case including a cylindrical sidewall part forming a sidewall thereof and a cover coupled to one end of the sidewall part; and an elastic member including at least one connection protrusion and connected to the case while the connection protrusion is interposed between the sidewall part and the cover.

The sidewall part may include at least one connection groove formed in one end thereof, wherein the connection groove has the connection protrusion inserted thereinto.

The sidewall part may include at least one fitting protrusion protruded from one end thereof, the cover may include at least one fitting groove formed along an outer peripheral edge thereof, and the sidewall part and the cover may be coupled to each other while the fitting protrusion is inserted into the fitting groove.

The cover may include at least one coupling protrusion protruded from an outer peripheral edge thereof in a diameter direction, and the sidewall part may include at least one coupling groove formed in one end thereof, wherein the coupling groove has the coupling protrusion fitted thereinto.

The elastic member may be connected to the case in order that the connection protrusion thereof is exposed to the outside of the case.

The cover may include at least one exposure groove formed along an outer peripheral edge thereof, and the connection protrusion may be exposed to the outside by the exposure groove.

The elastic member may be bonded to the case by welding the connection protrusion exposed to the outside to the case.

According to another aspect of the present invention, there is provided a method of manufacturing a linear vibrator, the method including: preparing a cylindrical sidewall part forming a sidewall, a cover coupled to one end of the sidewall part, and an elastic member including at least one connection protrusion; coupling the elastic member to the sidewall part by fitting the connection protrusion into one end of the sidewall part; and coupling the cover to one end of the sidewall part.

The coupling of the elastic member may include fitting the connection protrusion into at least one connection groove formed in one end of the sidewall part.

The coupling of the cover may include fitting at least one fitting protrusion protruded from one end of the sidewall part into at least one fitting groove formed along an outer peripheral edge of the cover.

The coupling of the cover may include fitting at least one coupling protrusion protruded from an outer peripheral edge of the cover in a diameter direction into at least one coupling groove formed in one end of the sidewall part.

The coupling of the elastic member may include connecting the elastic member to the sidewall part in order that the connection protrusion thereof is exposed to the outside of the sidewall part.

The method may further include, after the coupling of the cover, welding and bonding the connection protrusion exposed to the outside, the sidewall part, and the cover to each other.

The preparing of the cover may include forming the cover to have a magnetic field part connected to an inner portion thereof, the magnetic field part generating magnetic force.

The preparing of the elastic member may include forming the elastic member to have a vibration part connected to a central portion thereof, the vibration part including a coil and a mass body.

The method may further include, after the coupling of the cover, coupling a bracket to the other end of the sidewall part; and welding and bonding the elastic member, the sidewall part, the cover, and the bracket to each other.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
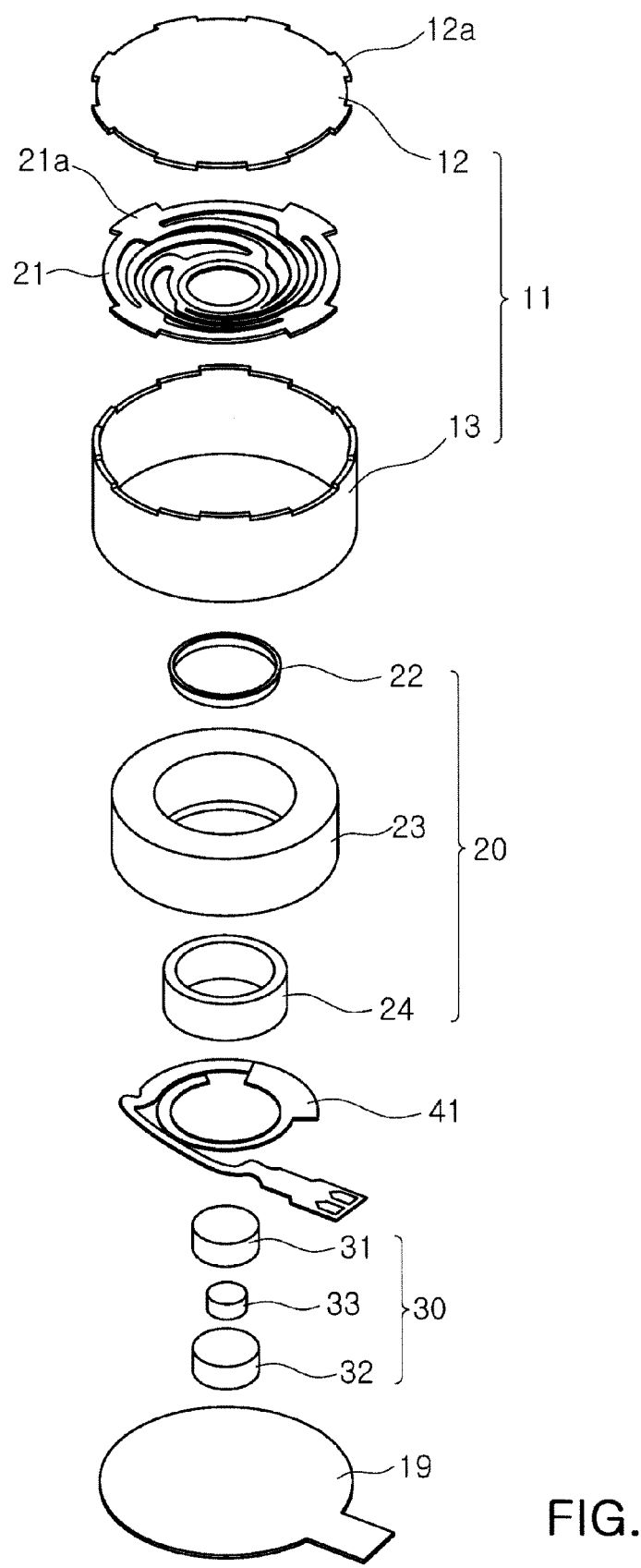
FIG. 1 is a schematic exploded perspective view of a linear vibrator according to an embodiment of the present invention.

Prior to a detailed description of the present invention, the terms or words, which are used in the specification and claims to be described below, should not be construed as having typical or dictionary meanings. The terms or words should be construed in conformity with the technical idea of the present invention on the basis of the principle that the inventor(s) can appropriately define terms in order to describe his or her invention in the best way. Embodiments described in the specification and structures illustrated in drawings are merely exemplary embodiments of the present invention. Thus, it is intended that the present invention covers the modifications and variations of this invention, provided they fall within the scope of their equivalents at the time of filing this application.

Exemplary embodiments of the present invention will be described in detail with reference to the accompanying drawings. The same reference numerals will be used throughout to designate the same or like elements in the accompanying drawings. Moreover, detailed descriptions related to well-known functions or configurations will be ruled out in order not to unnecessarily obscure subject matters of the present invention. In the drawings, the shapes and dimensions of some elements may be exaggerated, omitted or schematically illustrated. Also, the size of each element does not entirely reflect an actual size.

Hereinafter, embodiments of the present invention will be described in detail with reference to the accompanying drawings.

Figure 2:
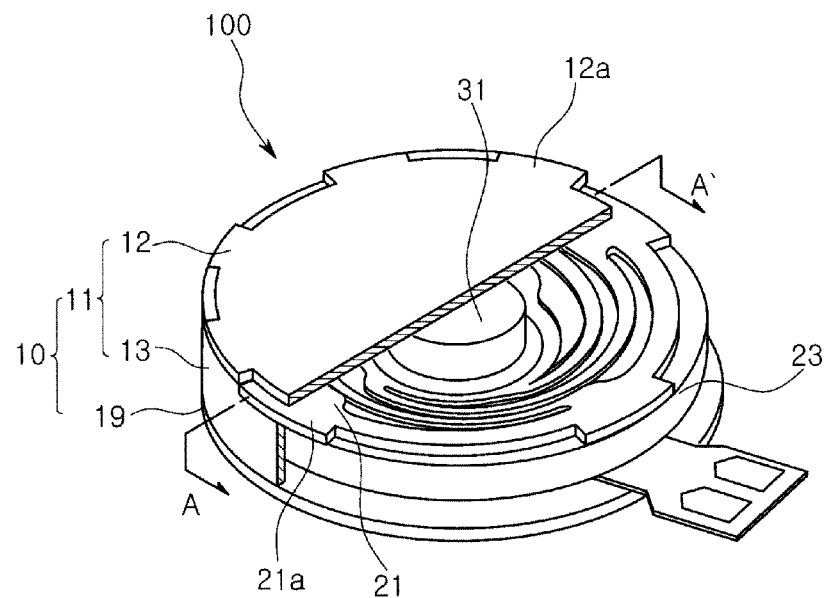
FIG. 2 is a schematic partially cut-away perspective view of the linear vibrator according to the embodiment of the present invention.
Figure 3:
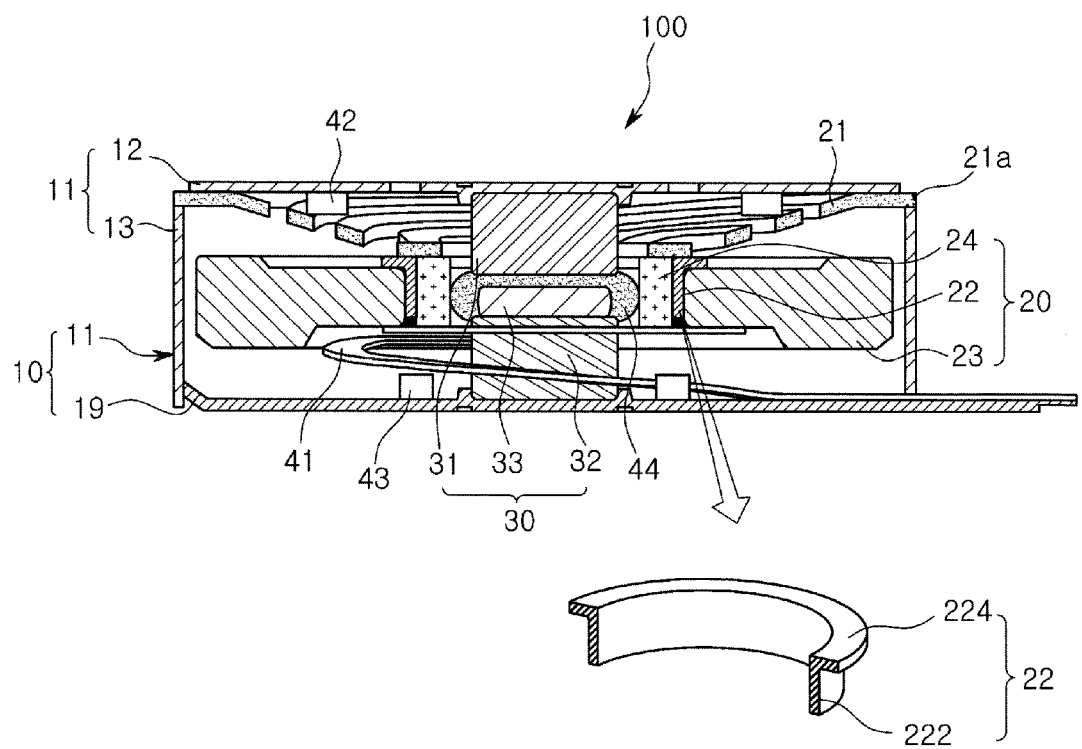
FIG. 3 is a schematic cross-sectional view taken along line A-A' of FIG. 2.

FIG. 1 is a schematic exploded perspective view of a linear vibrator according to an embodiment of the present invention; FIG. 2 is a schematic partially cut-away perspective view of the linear vibrator according to the embodiment of the present invention; and FIG. 3 is a schematic cross-sectional view taken along line A-A' of FIG. 2.

Referring to FIGS. 1 through 4, a linear vibrator 100 according to an embodiment of the present invention may include a housing 10, a magnetic field part 30, a vibration part 20, and an elastic member 21.

The housing 10 may include a case 11 having an inner space with a predetermined size and a bracket 19 connected to an open surface of the case 11 to close the inner space.

The case 11 and the bracket 19 may serve to protect the linear vibrator 110 from the outside and be generally formed of a metal material.

The case 11 may be coupled to the bracket 19 to form the overall exterior appearance and the inner space of the linear vibrator 100. Hereinafter, a description will be provided with reference to FIGS. 4A through 4D, which are exploded perspective views of a cover 12 and a sidewall part 13 according to the present embodiment.

The case 11 according to the present embodiment may include the cover 12 and the sidewall part 13.

The cover 12 may be connected to one end of the sidewall part 13 to form an inner space together with the sidewall part 13. Therefore, the cover 12 may have a disk shape corresponding to a peripheral shape of the sidewall part 13.

Figure 4A:
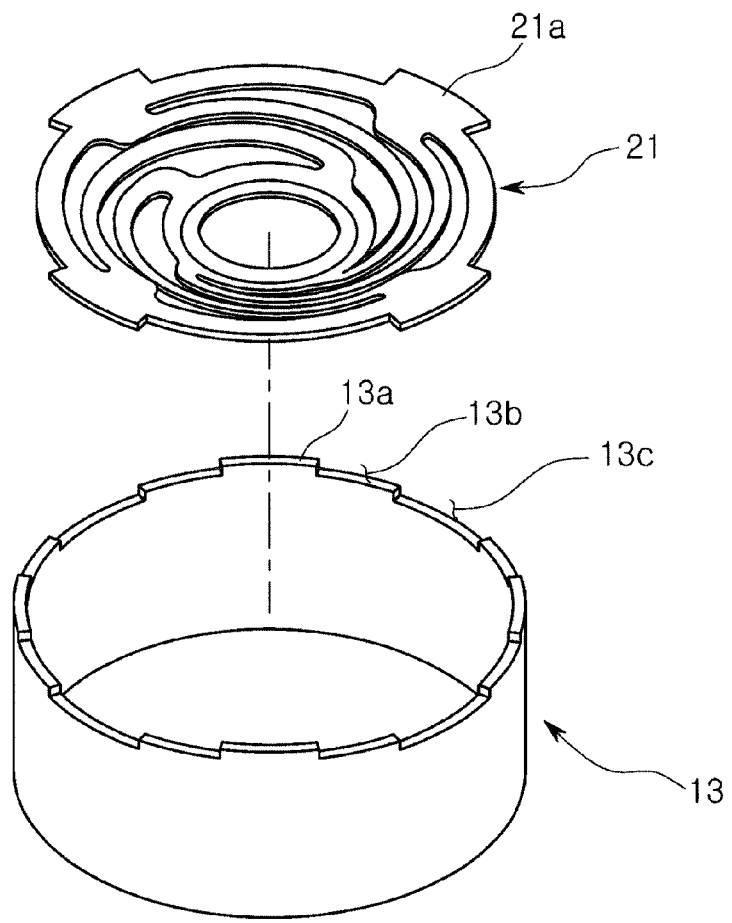
FIGS. 4A through 4D are perspective views describing a method of manufacturing a linear vibrator according to the embodiment of the present invention.
Figure 4B:
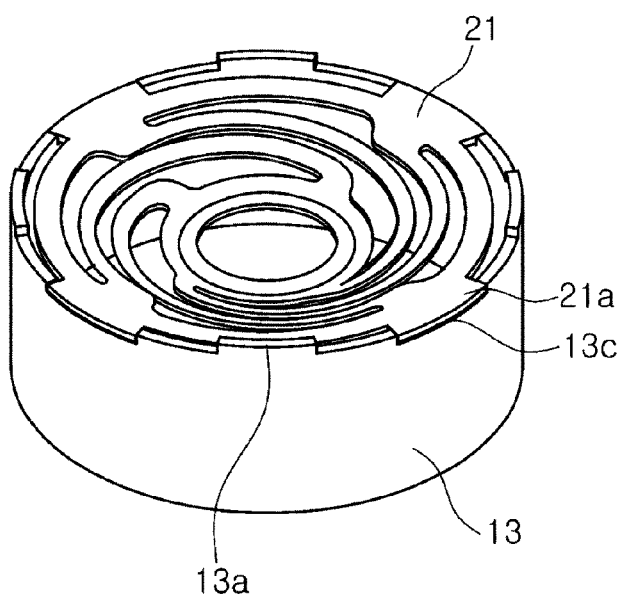
Figure 4C:
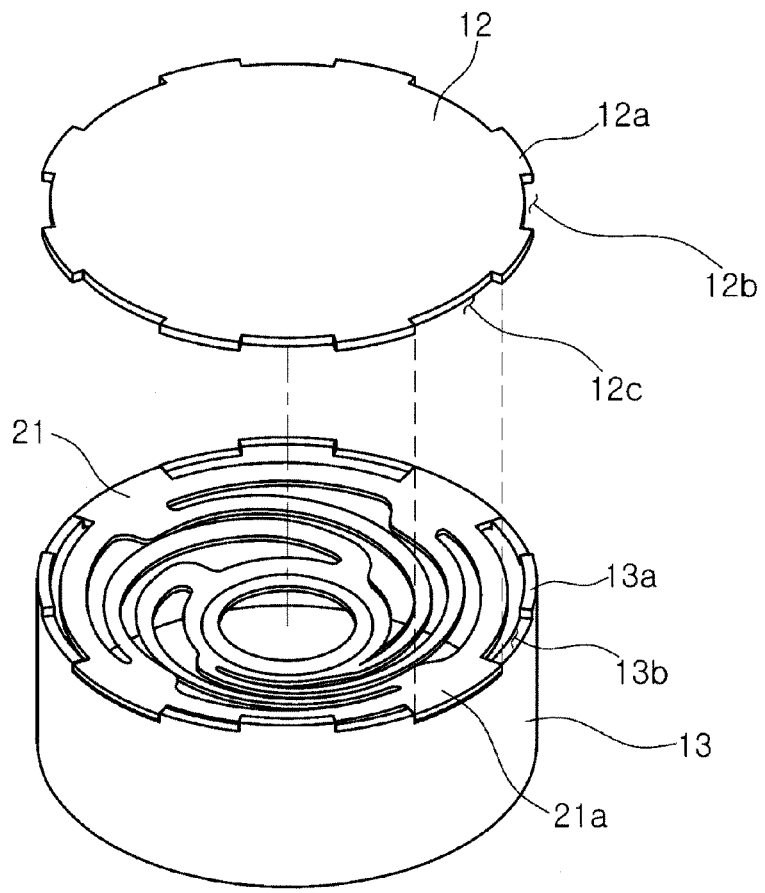

In addition, as shown in FIG. 4C, the cover 12 according to the present embodiment may have at least one coupling protrusion 12a formed on an outer peripheral edge thereof. The coupling protrusion 12a may be engaged with a coupling groove 13b of the sidewall part 13 to be described below at the time of coupling the cover 12 and the sidewall part 13. Therefore, the shape of the coupling protrusion 12a may correspond to that of the coupling groove 13b.

More specifically, the coupling protrusion 12a may protrude from an outer peripheral edge thereof by a thickness of the coupling groove 13b, that is, a thickness of the sidewall part 13, and protrude for a length corresponding to that of the coupling groove 13b.

In addition, a space between the coupling protrusions 12a may be formed as a fitting groove 12b and an exposure groove 12c.

A fitting protrusion 13a of the sidewall part 13 to be described below may be inserted and fitted into the fitting groove 12b. Therefore, when the cover 12 is coupled to the sidewall part 13, the fitting groove 12b is formed in a position corresponding to that of the fitting protrusion 13a.

When the elastic member 21 to be described below is coupled to the case 11, the exposure groove 12c is provided in order to expose a connection protrusion 21a of the elastic member 21 to the outside. Therefore, the exposure groove 12c is formed in a position corresponding to that of the connection protrusion 21a.

The present embodiment describes a case in which the fitting groove 12b and the exposure groove 12c have the same size and shape by way of example. According to the above-mentioned configuration, the cover 12 may be easily coupled to the sidewall part 13 regardless of a direction.

However, the present invention is not limited thereto. That is, the sizes, number, and shapes of the fitting grooves 12b and the exposure grooves 12c may be different as needed.

In addition, although the present embodiment describes a case in which the fitting grooves 12b and the exposure grooves 12c are alternately disposed by way of example, the fitting grooves 12b and the exposure grooves 12c are not limited to being disposed in the above-mentioned form but may be disposed in various forms as needed.

The sidewall part 13 has a cylindrical shape having open ends and a hollow inner portion and forms the side of the case 11.

The sidewall part 13 may have the cover 12 connected to one end thereof and the bracket 19 connected to the other end thereof.

In addition, the sidewall part 13 may have a step in one end thereof in order to be connected to the cover 12 and the elastic member 21 to be described below.

More specifically, the step formed in one end of the sidewall part 13 may include the coupling grooves 13b, connection grooves 13c, and the fitting protrusions 13a.

The coupling protrusion 12a of the cover 12 described above may be fitted into the coupling groove 13b while being engaged therewith. Therefore, the shape of the coupling groove 13b may correspond to that of the coupling protrusion 12a of the cover 12. That is, the coupling groove 13b may have a width and a depth corresponding to a length and a thickness of the coupling protrusion 12a.

The fitting protrusion 13a may protrude from the coupling groove 13b by the thickness of the coupling protrusion 12a of the cover 12. Therefore, the coupling groove 13b may be formed to have a groove shape by the fitting protrusion 13a.

This fitting protrusion 13a may be fitted into the fitting groove 12b of the cover 12 while being engaged therewith. Therefore, the shape of the fitting protrusion 13a may correspond to that of the fitting groove 12b. That is, the fitting protrusion 13a may have a length corresponding to a width of the fitting groove 12b and have a thickness corresponding to a depth (that is, a protrusion distance of the coupling protrusion) of the fitting groove 12b.

The connection protrusion 21a of the elastic member 21 may be fitted into the connection groove 13c while being engaged therewith. Therefore, the shape of the connection groove 13c may correspond to that of the connection protrusion 21a. Therefore, the connection groove 13c may have a depth and a width corresponding to a thickness and a length of the connection protrusion 21a.

In the case 11 according to the present embodiment configured as described above, the sidewall part 13 and the cover 12 are separately manufactured and then coupled to each other to form a single assembly, unlike the case according to the related art formed in an integral shape.

This is to easily connect the elastic member 21 to the case 11, which will be described in detail in a description of the elastic member 21 to be provided below.

Meanwhile, the housing may have at least one or more dampers 42 and 43 (See FIG. 3) provided therein. The dampers 42 and 43 may be formed of a material having elasticity so as to prevent contact due to linear movement of the vibration part 20 to be described below.

The dampers 42 and 43 may prevent generation of touch noise or abrasion due to contact between the vibration part 20 and the case 11 or the bracket 19 caused by excessive vibrations of the vibration part 20. In addition, when an external impact is applied thereto, the dampers 42 and 43 may absorb the external impact to extend a lifespan of the linear vibrator 100.

According to the present embodiment, a first damper 42 and a second damper 43 may be included.

The first damper 42 may be attached to an inner surface of the case 11 to prevent generation of friction or abrasion due to contact between the case 11 and the other components such as the elastic member 21, and the like.

The second damper 43 may be attached to an inner surface of the bracket 19 to prevent generation of friction or abrasion due to contact between the vibration part 20 and the bracket 19 at the time of vibrations of the vibration part 20.

These dampers 42 and 43 may have a ring shape and receive magnets 31 and 32 therein. However, the present invention is not limited thereto.

The dampers 42 and 43 may be formed of various materials capable of absorbing impacts, such as rubber, cork, propylene, or the like.

The magnetic field part 30 may include the magnets 31 and 32 and a plate 33.

The magnets 31 and 32 may be disposed at a central portion of the inner space formed by the case 11 and the bracket 19 and include a first magnet 31 and a second magnet 32.

The first magnet 31 may be connected to the inner surface of the case 11 in contact with the inner surface of the case 11, and the second magnet 32 may be connected to the inner surface of the bracket 19 in contact with the inner surface of the bracket 19.

The first and second magnets 31 and 32 may be cylindrical permanent magnets generating magnetic force having a predetermined strength by magnetizing upper and lower portions as different poles in a vertical direction so as to generate magnetic fields.

The first and second magnets 31 and 32 may be fixed to the case 11 and the bracket 19 by an adhesive, respectively.

In addition, the first and second magnets 31 and 32 may be spaced apart from each other while being disposed such that portions thereof having the same polarity face each other in order to generate magnetic force.

Lines of magnetic force present between the first and second magnets 31 and 32 are spread in an outer radial direction since the first and second magnets 31 and 32 are disposed such that the portions thereof having the same polarity face each other, whereby magnetic efficiency may be increased.

As described above, in the magnetic field part 30 according to the present embodiment, since magnetic force is concentrated between the first and second magnets 31 and 32, in the case of an equal amount of current being consumed in the same volume, a larger amount of electromagnetic force may be realized as compared to a single magnet, such that a large amount of vibrations may be obtained.

Meanwhile, the magnets 31 and 32 are not limited to being configured of the first and second magnets 31 and 32 but may also be configured of at least two or more magnets as long as portions thereof having the same polarity may face each other.

In addition, the first and second magnets 31 and 32 may have the plate 33 interposed therebetween in order to smooth a flow of the magnetic field formed by the magnets 31 and 32. Therefore, the plate 33 may be formed of a magnetic material.

In addition, a magnetic fluid 44 may be applied between an outer peripheral surface of the plate 33 and a coil 24.

The magnetic fluid 44 may be disposed in a clearance formed between the magnets 31 and 32 or the plate 33 and the coil 24 in order to smooth vertical movement of the vibration part 20.

The magnetic fluid 44 may serve to prevent abnormal vibration of the vibration part 20 to be described below. That is, the magnetic fluid 44 may suppress horizontal vibrations in the case in which horizontal movement of the vibration part 20 is caused due to an external impact, induce the vibration part 20 to be linearly vibrated, and prevent residual vibrations.

In addition, the magnetic fluid 44 may fill a gap between outer surfaces of the magnets 31 and 32 and an inner surface of a hollow part of the coil 24 to thereby allow the vibration part 20 to be smoothly vibrated and slid.

The vibration part 20, a member disposed to be vertically vibrated through the elastic member 21 to be described below, may include the coil 24, a holder 22, and a mass body 23.

The coil 24 may be disposed to face the first and second magnets 31 and 32, and the first and second magnets 31 and 32 may be partially inserted into a space formed by the coil 24.

When current is applied to the coil 24 according to a predetermined frequency, a magnetic field may be induced around the coil 24. When magnetic force is generated through the coil 24, the magnetic force interferes with the magnetic field formed by the magnets 31 and 32, such that the vibration part 20 vibrates vertically.

Here, when electromagnetic force is generated using a natural frequency of the vibration part 20, resonant vibration is generated in the vibration part 20, whereby a maximum amount of vibrations may be obtained. In addition, the natural frequency of the vibration part 20 may be determined by mass of the vibration part 20 and an elastic modulus of the elastic member 21.

Meanwhile, a printed circuit board 41 (for example, a flexible substrate) may be coupled to a lower surface of the coil 24 in order to provide current to the coil 24.

This coil 24 may be coupled to a hollow inner surface of the holder 22 to be described below.

The holder 22 may fixedly support the mass body 23 coupled to an outer peripheral surface of the coil 24. To this end, the holder 22 may have a cylindrical shape in which it has open upper and lower portions and a hollow inner portion.

More specifically, the holder 22 may include a cylindrical vertical part 222 contacting one surface of the coil 24 and the mass body 23 and a horizontal part 224 extended from an end portion of the vertical part 222 in an outer radial direction to support the other surface of the mass body 23.

The vertical part 222 may have an outer peripheral surface contacting the mass body 23 to fixedly support the mass body 23 and an inner peripheral surface fixedly supporting the coil 24.

The holder 22 may be formed of iron. This is to easily and firmly couple the holder 22 and the elastic member 21 to each other by forming the holder using the same material as that of the elastic member 21. However, the holder 22 and the elastic member 21 are not limited to be formed of the iron but may be formed of any material as long as the holder 22 and the elastic member 21 may be easily and firmly coupled to each other.

The mass body 23 may be a vibration body coupled to an outer surface of the vertical part 222 of the holder 22 to vertically vibrate together with the holder 22. The mass body 23 may have an outer diameter smaller than an inner diameter of the sidewall part 13 so as to vertically vibrate within the housing 10 without contact.

Therefore, a clearance having a predetermined size may be formed between an inner peripheral surface of the sidewall part 13 and an outer peripheral surface of the mass body 23.

This mass body 23 may be formed of a non-magnetic material or a paramagnetic material that is not affected by the magnetic force generated from the first and second magnets 31 and 32.

Therefore, the mass body 23 may be formed of a material, such as tungsten, having a specific gravity heavier than that of iron. This is to increase mass of the vibration part 20 in the same volume to control a resonant frequency, thereby significantly increasing an amount of vibrations.

However, a material of the mass body 23 is not limited to tungsten but may be various materials according to a designer's intention.

The elastic member 21 may be coupled to the holder 22 and the case 11 to provide elastic force thereto. To this end, the elastic member 21 according to the present embodiment may be formed as a leaf spring having a spiral shape.

The elastic member 21 may have the vibration part 20 connected to a central portion thereof. In addition, the elastic member 21 may have the case 11 connected to an outer side thereof, that is, an outer peripheral edge thereof.

To this end, the elastic member 21 according to the present embodiment may include the connection protrusion 21a and be connected to the case 11 in a manner such that the connection protrusion 21a is interposed between the sidewall part 13 and the cover 12.

More specifically, the elastic member 21 according to the present embodiment may include at least one connection protrusion 21a protruded from the outer peripheral edge thereof in a diameter direction and be coupled to the case 11 while the connection protrusion 21a thereof is fitted into the connection groove 13c of the case 11.

Therefore, the number and shape of the connection protrusion 21a may correspond to those of the connection groove 13c.

Meanwhile, although the present embodiment describes a case in which the elastic member 21 is formed as the leaf spring having the spiral shape by way of example, the present invention is not limited thereto. That is, the elastic member 21 may be any member capable of being connected to the case 11 to provide elastic force to the vibration part 20.

In the linear vibrator 100 according to the present embodiment configured as described above, the case 11 may include the sidewall part 13 and the cover 12 separately manufactured, and the elastic member 21 may be connected to the case 11 by fitting the connection protrusion 21a of the elastic member 21 between the sidewall part 13 and the cover 12 (that is, into the connection groove).

Therefore, after the case 11 and the elastic member 21 are mechanically coupled to each other, the case 11 and the elastic member 21 may be bonded to each other through welding on an outer portion of the case 11. Therefore, a phenomenon that foreign objects enter the case 11 during the welding process may be prevented.

Hereinafter, a method of manufacturing a linear vibrator according to an embodiment of the present invention will be described.

FIGS. 4A through 4D are perspective views describing a method of manufacturing a linear vibrator according to an embodiment of the present invention.

Referring to FIGS. 4A through 4D, as shown in FIG. 4A, the sidewall part 13 and the elastic member 21 are prepared. Here, although not shown in FIG. 4A, the vibration part 20 (See FIG. 3) may be connected to the central portion of the elastic member 21 in advance. That is, in this operation, the elastic member 21 having the vibration part 20 connected thereto and the sidewall part 13 are prepared.

Then, as shown in FIG. 4B, the elastic member 21 is coupled to the sidewall part 13. In this operation, the elastic member 21 is coupled to the sidewall part 13 while the connection protrusion 21a thereof is fitted into the connection groove 13c of the sidewall part 13.

Next, as shown in FIG. 4C, the cover 12 is prepared. Here, although not shown in FIG. 4B, the magnetic field part may be connected to a central portion of an inner surface of the cover 12 in advance. That is, in the present operation, the cover 12 having the magnetic field part connected thereto may be prepared.

However, the present invention is not limited thereto. That is, the magnetic field part may be connected to the bracket 19 and be then disposed within the case 11 in an operation of coupling the bracket 19 to be described below.

Figure 4D:
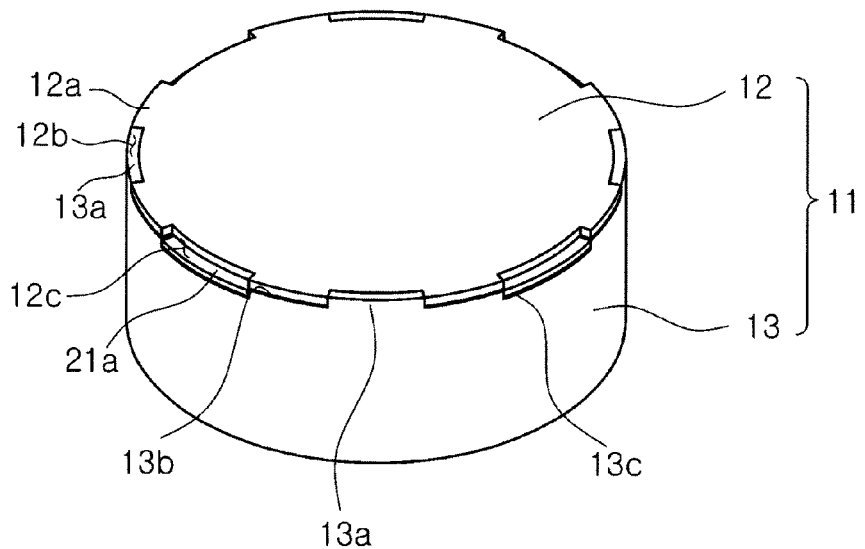

Thereafter, as shown in FIG. 4D, the cover 12 is coupled to the sidewall part 13. In this operation, the cover 12 is coupled to the sidewall part 13 while the coupling protrusion 12a thereof is inserted into the coupling groove 13b of the sidewall part 13. At this time, the cover 12 and the sidewall part 13 are coupled to each other while the fitting protrusion 13a of the sidewall part 13 is fitted into the fitting groove 12b of the cover 12.

Next, the sidewall part 13, the cover 12, and the elastic member 21 are firmly bonded to each other through welding. When the cover 12 is coupled to the sidewall part 13 through the above-mentioned process, the connection protrusion 21a of the elastic member 21 is exposed to the outside through the exposure groove 12c.

Therefore, the sidewall part 13, the cover 12, the case 11, and the elastic member 21 may be easily welded to each other.

The welding process may be performed by laser welding. However, the present invention is not limited thereto. That is, the bonding of the sidewall part 13, the cover 12, and the elastic member 21 to each other may be performed using an adhesive. In addition, when the case 11 or the elastic member 21 is formed of a resin material, ultrasonic fusion may also be used.

Further, the welding process may be performed along contact surfaces among the sidewall part 13, the cover 12, and the elastic member 21. More specifically, the welding process may be mainly performed on the fitting groove 12b, the fitting protrusion 13a, the connection groove 13c, and the connection protrusion 21a. Therefore, the sidewall part 13, the cover 12, the case 11, and the elastic member 21 may be firmly bonded to each other.

Then, the bracket 19 is coupled to the other end of the sidewall part 13 and they are subjected to a welding process. Here, as described above, the bracket 19 having the magnetic field part connected thereto in advance may be used.

Meanwhile, the present embodiment is not limited to the above-mentioned manufacturing method but may be variously modified. For example, first and second magnets 31 and 32 are connected to the bracket 19 and the cover 12 in advance, respectively, and the above-mentioned operations are then sequentially performed.

In addition, the elastic member 21 and the cover 12 may be mechanically assembled to one surface of the sidewall part 13, the bracket 19 may be mechanically assembled to the other surface thereof, and both ends of the sidewall part 13 may then be welded at a time.

In this case, since the welding process is performed only once, manufacturing time may be reduced.

As set forth above, with the linear vibrator and the method of manufacturing the linear vibrator according to the present embodiment described above, the linear vibrator 100 may be manufactured using only a process of coupling the case 11, the bracket 19, and the elastic member 21 to each other and welding thereof.

That is, in the case in which the magnetic field part 30 is connected to the cover 12 or the bracket 19 in advance and the vibration part 20 is connected to the elastic member 21 in advance, the linear vibrator 100 may be manufacturing using only a process of coupling the elastic member 21 and the cover 12 to one surface of the sidewall part 13 and a process of coupling the bracket 19 to the other surface thereof.

Therefore, a manufacturing process is significantly simplified, whereby automation of the manufacturing process and a reduction in the number of workers required therefor may be realized.

In addition, according to the related art, a method of inserting the elastic member 21 into the case 11 and welding the elastic member 21 and the case 11 to each other in the case 11 has been mainly used. In this case, since foreign objects generated during the welding process remain in the case 11, a defect occurs in the linear vibrator 100.

However, according to the present embodiment, after the case 11 and the elastic member 21 are mechanically coupled to each other, the case 11 and the elastic member 21 may be bonded to each other by being welded on the outer portion of the case 11. Therefore, a phenomenon that the foreign objects enter the case 11 during the welding process may be prevented.

In addition, since the bracket 19, the case 11, and the elastic member 21 may be welded to each other at a time after all of components of the linear vibrator 100 are mechanically coupled to each other, a manufacturing process may be facilitated as compared to the linear vibrator according to the related art in which the elastic member is first welded and the case and the bracket are then welded.

Meanwhile, the linear vibrator and the method of manufacturing the same according to the present invention described above are not limited to the above-mentioned embodiments but may be variously modified.

For example, although the above-mentioned embodiments describe a case in which four connection protrusions are formed in the elastic member, the present invention is not limited thereto. That is, the number, shape and position of the connection protrusions may be varied.

In addition, although the above-mentioned embodiments describe the linear vibrator by way of example, the present invention is not limited thereto but may be variously applied to any device in which the elastic member vibrating the mass body is connected to the case.

While the present invention has been shown and described in connection with the embodiments, it will be apparent to those skilled in the art that modifications and variations can be made without departing from the spirit and scope of the invention as defined by the appended claims.

What is claimed is:

1. A linear vibrator comprising:
   a case including a cylindrical sidewall part forming a sidewall thereof and a cover coupled to one end of the sidewall part; and
   an elastic member including at least one connection protrusion and connected to the case while the connection protrusion is interposed between the sidewall part and the cover,
   wherein the cover includes at least one exposure groove formed in an outer peripheral edge thereof and the upper surface of the connection protrusion is exposed to the outside by the exposure groove.

2. The linear vibrator of claim 1, wherein the sidewall part includes at least one connection groove formed in one end thereof, the connection groove having the connection protrusion inserted thereinto.

3. The linear vibrator of claim 1, wherein the sidewall part includes at least one fitting protrusion protruded from one end thereof,
   the cover includes at least one fitting groove formed along an outer peripheral edge thereof, and the sidewall part and the cover are coupled to each other while the fitting protrusion is inserted into the fitting groove.

4. The linear vibrator of claim 1, wherein the cover includes at least one coupling protrusion protruded from an outer peripheral edge thereof in a diameter direction, and the sidewall part includes at least one coupling groove formed in one end thereof, the coupling groove having the coupling protrusion fitted thereinto.

5. The linear vibrator of claim 1, wherein the elastic member is connected to the case in order that the connection protrusion thereof is exposed to the outside of the case.

6. The linear vibrator of claim 5, wherein the elastic member is bonded to the case by welding the connection protrusion exposed to the outside to the case.

* * * * *